United States Patent
Suzuki et al.

(10) Patent No.: US 8,996,264 B2
(45) Date of Patent: Mar. 31, 2015

(54) CONTROL DEVICE FOR CONTINUOUSLY VARIABLE TRANSMISSION AND CONTROL METHOD FOR CONTINUOUSLY VARIABLE TRANSMISSION

(75) Inventors: Tomoyuki Suzuki, Isehara (JP); Akihiro Makiyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/343,206

(22) PCT Filed: Jul. 20, 2012

(86) PCT No.: PCT/JP2012/068491
§ 371 (c)(1),
(2), (4) Date: Mar. 6, 2014

(87) PCT Pub. No.: WO2013/035447
PCT Pub. Date: Mar. 14, 2013

(65) Prior Publication Data
US 2014/0214292 A1 Jul. 31, 2014

(30) Foreign Application Priority Data
Sep. 7, 2011 (JP) .................................. 2011-194774

(51) Int. Cl.
| G06F 17/00 | (2006.01) |
| F16H 61/66 | (2006.01) |
| F16H 61/662 | (2006.01) |
| F16H 59/48 | (2006.01) |
| F16H 59/18 | (2006.01) |

(52) U.S. Cl.
CPC .......... *F16H 61/66* (2013.01); *F16H 61/66259* (2013.01); *F16H 59/48* (2013.01); *F16H 2059/183* (2013.01)

USPC ........................................................ 701/58

(58) Field of Classification Search
None
See application file for complete search history.

(56) References Cited

U.S. PATENT DOCUMENTS

| 4,701,853 | A * | 10/1987 | Osanai ............................ 701/58 |
| 6,389,348 | B1 * | 5/2002 | Takagi et al. .................... 701/58 |
| 7,011,602 | B2 * | 3/2006 | Makiyama et al. .............. 477/44 |
| 8,585,551 | B2 * | 11/2013 | Choby ........................... 477/120 |
| 2004/0097328 | A1 | 5/2004 | Makiyama et al. |
| 2009/0043468 | A1 | 2/2009 | Kondo et al. |

FOREIGN PATENT DOCUMENTS

| JO | 2002-372143 A | 12/2002 |
| JP | 2004-183854 A | 7/2004 |
| JP | 2006-51842 A | 2/2006 |

* cited by examiner

*Primary Examiner* — Dirk Wright
(74) *Attorney, Agent, or Firm* — Foley & Lardner LLP

(57) ABSTRACT

A control device for continuously variable transmission includes an operating state detection means for detecting an operating state of a vehicle including a vehicle speed and an accelerator pedal opening, a control means for controlling a speed ratio of a continuously variable transmission based on the operating state, an acceleration request determination means for determining the presence or absence of an acceleration request of a driver based on the accelerator pedal opening, and a speed ratio setting means for setting a speed reduction ratio controlled by the control means to be smaller with an increase in an acceleration start vehicle speed if the accelerator pedal opening is equal during acceleration. The control means updates the acceleration start vehicle speed to a vehicle speed at the time of a determination after determining that the accelerator pedal opening has been increased during acceleration.

5 Claims, 7 Drawing Sheets

CONTROL DEVICE FOR CONTINUOUSLY VARIABLE TRANSMISSION AND CONTROL METHOD FOR CONTINUOUSLY VARIABLE TRANSMISSION

TECHNICAL FIELD

The present invention relates to a control device for continuously variable transmission and a control method for continuously variable transmission.

BACKGROUND ART

The following is disclosed as a control device for continuously variable transmission in JP2004-183854A. When there is a request for kickdown acceleration, a down-shift transmission characteristic and an up-shift transmission characteristic are respectively determined based on an accelerator pedal opening and a vehicle speed and a down-shift target speed ratio suppressed more than a normal target speed ratio and an up-shift target speed ratio are calculated based on these transmission characteristics. After down-shifting to the down-shift target speed ratio, a transmission control is executed along a virtual transmission line to be shifted up according to the up-shift target speed ratio. At this time, a transmission line at the time of acceleration is set according to an acceleration start vehicle speed. The speed ratio is set to be reduced with an increase in the acceleration start vehicle speed if the accelerator pedal opening is equal. The speed ratio is set in this way in order to prevent the occurrence of so-called rubber band feel in which a drive force is not so increased as expected despite an increase in an engine rotation speed and a state as if an engine would idle is entered to give a sense of incongruity to a driver.

SUMMARY OF INVENTION

The control device of JP2004-183854A is so configured that a driver's intention to accelerate is detected based on the accelerator pedal opening and the acceleration start vehicle speed is updated when the intention to accelerate is detected. Thus, in the case of acceleration by further depressing an accelerator pedal during travel in a moderately accelerating state, the rubber band feel may occur. To more specifically describe this, a case is considered where, for example, a vehicle merges into a main lane while accelerating on an acceleration lane when entering an expressway, and makes a lane change after merging and further accelerates for overtaking. In this case, since the accelerator pedal opening is relatively large at the point of merging, an intention to accelerate may not be detected even if the accelerator pedal opening is increased to accelerate for overtaking. If no intention to accelerate is detected, the acceleration start vehicle speed is kept at a relatively low vehicle speed at the time of starting acceleration on the acceleration lane and a shift line corresponding to that acceleration start vehicle speed is set. Thus, a transmission control is executed according to the shift line set at the relatively low vehicle speed and the rubber band feel occurs since the accelerator pedal opening is increased at a relatively high vehicle speed after merging.

Accordingly, an object of the present invention is to provide a control device for continuously variable transmission capable of preventing the occurrence of rubber band feel in the case of further increasing an accelerator pedal opening during acceleration.

To achieve the above object, the present invention includes an operating state detection means for detecting an operating state of a vehicle including a vehicle speed and an accelerator pedal opening, a control means for controlling a speed ratio of a continuously variable transmission based on the operating state, and an acceleration request determination means for determining the presence or absence of an acceleration request of a driver based on the accelerator pedal opening. The invention further includes a speed ratio setting means for setting a speed reduction ratio controlled by the control means to be smaller with an increase in an acceleration start vehicle speed if the accelerator pedal opening is equal during acceleration. Furthermore, the control means updates the acceleration start vehicle speed to a vehicle speed at the time of a determination after determining that the accelerator pedal opening has been increased during acceleration.

Details, other features and advantages of this invention are described in the following description and shown in the accompanying drawings.

DESCRIPTION OF EMBODIMENTS

First Embodiment

Figure 1:
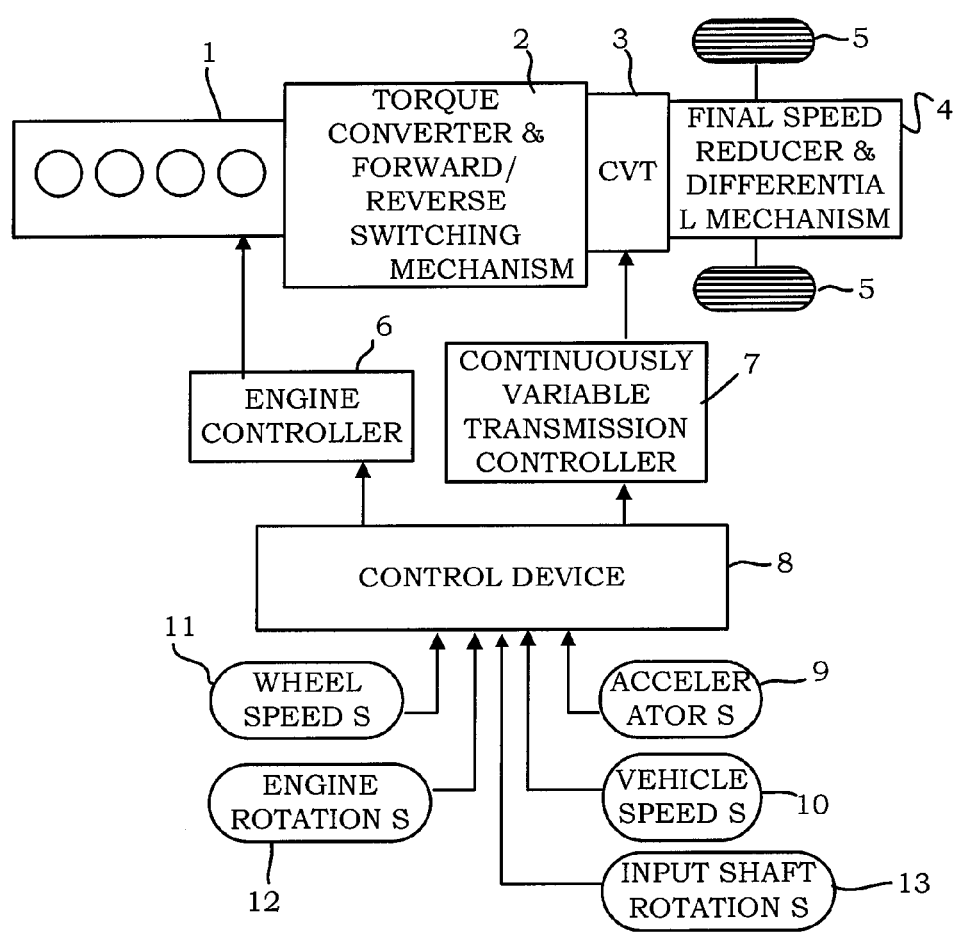
FIG. 1 is a schematic configuration diagram of a vehicle according to a first embodiment of the present invention.

FIG. 1 shows a schematic configuration of a vehicle provided with a transmission control device according to the present invention. A drive force of an internal combustion engine 1 is transmitted to drive wheels 5 via a torque converter and a forward/reverse switching mechanism 2, a continuously variable transmission 3, and a final speed reducer and a differential mechanism 4.

A fuel injection amount control, an ignition timing control and the like for the internal combustion engine 1 are executed by an engine controller 6.

A speed ratio of the continuously variable transmission 3 is continuously controlled by a continuously variable transmission controller 7.

A control device 8, together with each controller 6, 7, is configured by a microcomputer and its peripheral devices and controls the vehicle in a comprehensive manner. To the control device 8 are connected an accelerator sensor 9 for detecting an accelerator pedal opening, a vehicle speed sensor 10 for detecting a running speed of the vehicle, a wheel speed sensor 11 for detecting a rotation speed of the drive wheels 5, an engine rotation sensor 12 for detecting a rotation speed of the internal combustion engine 1, an input shaft rotation speed sensor 13 for detecting an input shaft rotation speed of the continuously variable transmission 3, etc. The continuously variable transmission controller 7 corresponds to a control means of the present invention and the accelerator sensor 9 and the vehicle speed sensor 10 correspond to an operating state detection means of the present invention.

It should be noted that, in the following description, a belt type CVT by a variable pulley mechanism is assumed as the continuously variable transmission 3 and the speed ratio is expressed by a pulley ratio in some cases. The pulley ratio or the speed ratio is synonymous with a speed reduction ratio, i.e. a value thereof expresses input pulley rotation speed/output pulley rotation speed.

The continuously variable transmission controller 7 normally executes a control mode for variably controlling the speed ratio based on the accelerator pedal opening and the vehicle speed (hereinafter, this is referred to as a normal mode). When a predetermined acceleration condition is satisfied, a switch is made to a control mode for suppressing a speed ratio change more than in the normal mode (hereinafter, this is referred to as a linear mode). This switch from the normal mode to the linear mode is made by a known control routine such as the one disclosed in JP2002-372143A.

Figure 2:
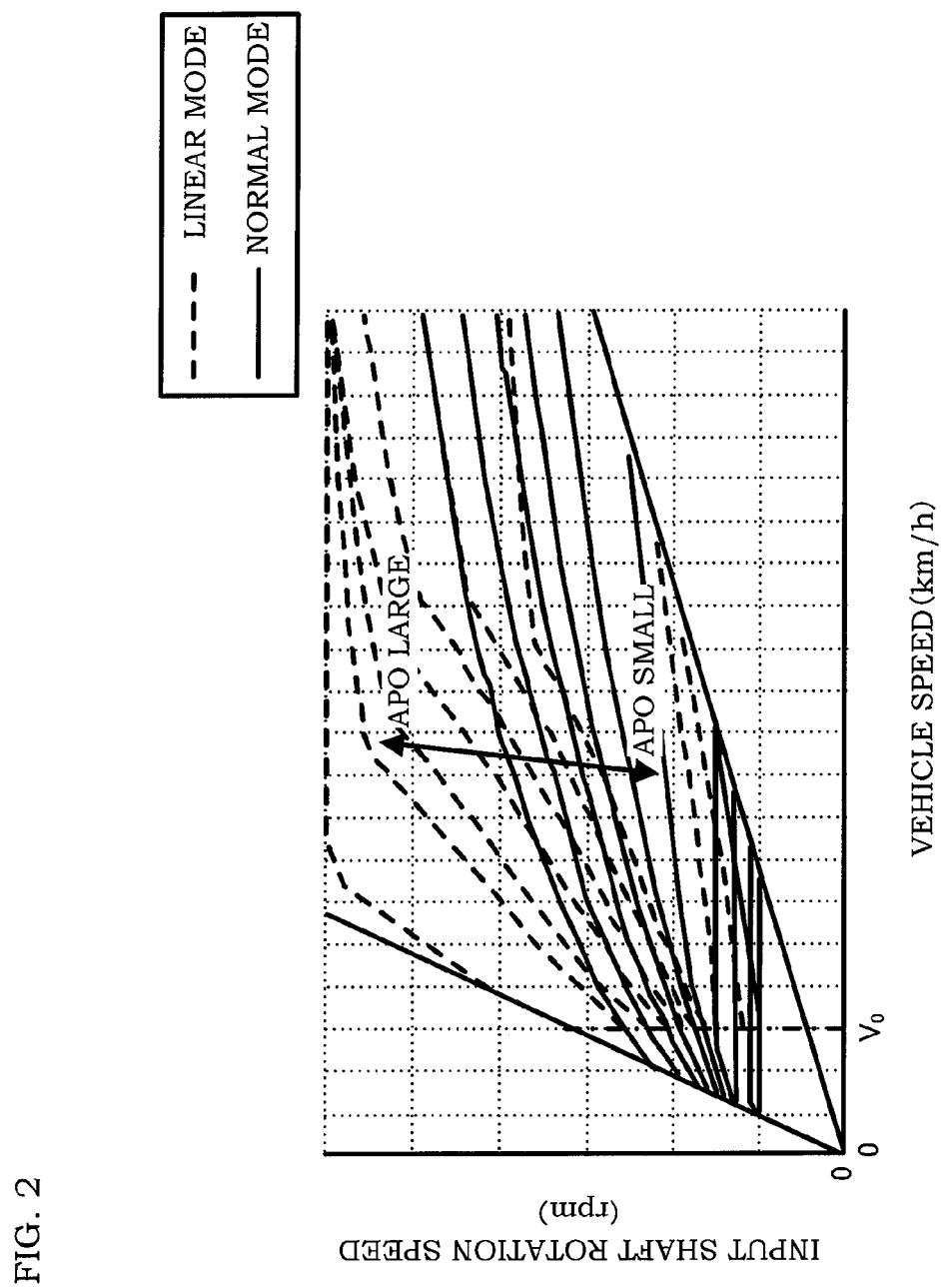
FIG. 2 is a graph showing examples of shift lines in a normal mode and a linear mode.

FIG. 2 is a graph showing examples of shift lines in the normal and linear modes. A vertical axis represents the input shaft rotation speed of the continuously variable transmission 3, a horizontal axis represents the vehicle speed, solid lines in FIG. 2 represent the shift lines in the normal mode and broken lines in FIG. 2 represent the shift lines in the linear mode. Further, a vehicle speed $V_0$ is a vehicle speed when the predetermined acceleration condition is satisfied, i.e. a vehicle speed at which a switch is made to the linear mode.

In the linear mode, the speed ratio change is suppressed more than in the normal mode. Accordingly, an increase in the input shaft rotation speed associated with an increase in the vehicle speed is larger in the linear mode than the normal mode. This realizes acceleration matching a driver's feeling that the vehicle speed increases with an increase in the engine rotation speed during acceleration.

Figure 3:
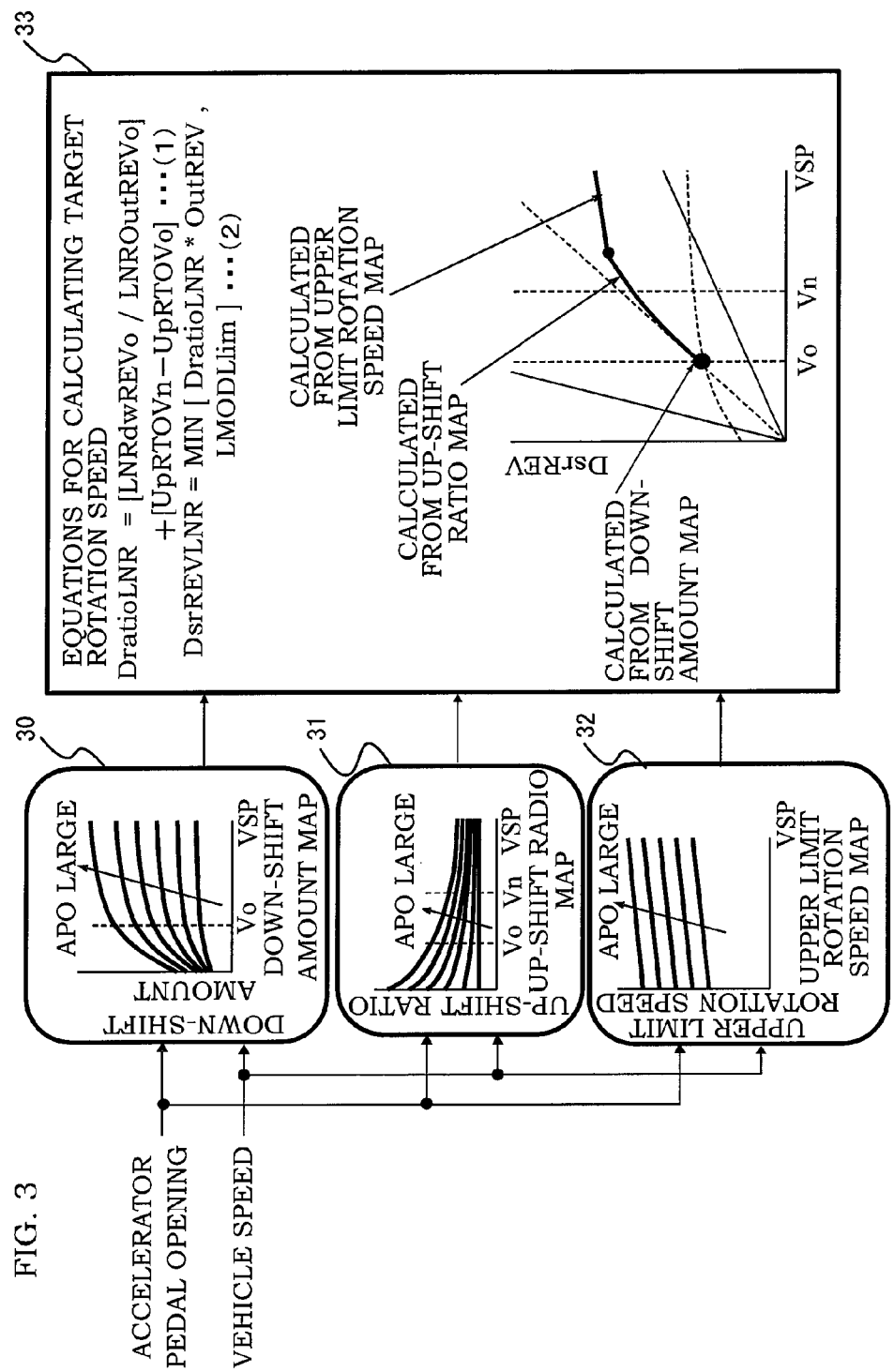
FIG. 3 is a block diagram of a shift line generation control executed by a continuously variable transmission controller in the linear mode.

FIG. 3 is a block diagram of a control executed by the continuously variable transmission controller 7 in the linear mode.

A vehicle speed VSP detected by the vehicle speed sensor 10 and an accelerator pedal opening APO detected by the accelerator sensor 9 are respectively input to a down-shift rotation speed map 30, an up-shift ratio map 31 and an upper limit rotation speed map 32.

The down-shift rotation speed map 30 is a map for calculating a down-shift rotation speed LNRdwREV0 at the time of starting acceleration.

The up-shift ratio map 31 is a map for calculating a gear ratio during the linear mode.

The upper limit rotation speed map is a map for calculating an upper limit rotation speed LMODLim of the input shaft rotation speed. It should be noted that any of the maps is set for each accelerator pedal opening APO and a value is calculated from values before and after by a complementary operation if there is no value corresponding to the input accelerator pedal opening APO.

A calculation result of each map is input to a shift line generation unit 33.

In the shift line generation unit 33, an input shaft rotation speed of the continuously variable transmission 3 during the linear mode (hereinafter, referred to as a target CVT input rotation speed DsrREV) is calculated in the following procedure. First, the target CVT input rotation speed DsrREV at the vehicle speed $V_0$ is determined based on the down-shift rotation speed LNRdwREV0 calculated in the down-shift rotation speed map 30. Then, a shift line is determined according to a speed ratio change characteristic calculated in the up-shift ratio map 31. Further, the upper limit of the target CVT input rotation speed DsrREV is limited by the upper limit rotation speed LMODLim calculated in the upper limit rotation speed map 32. In this way, the shift line during the linear mode is generated. This procedure is expressed by Equations (1), (2).

$$DratioLNR=[LNRdwREV_0/LNROutREV_0]+[UpRTOV_n-UpRTOV_0] \quad (1)$$

$$Dsr\,REVLNR=MIN[DratioLNR \times OutREV, LMODLim] \quad (2)$$

The first term of Equation (1), i.e. [LNRdwREV$_0$/LNROutREV$_0$] represents the conversion of a rotation speed into a speed ratio by dividing the down-shift rotation speed LNRdwREV0 at the time of starting acceleration by an output shaft rotation speed LNROutREV0. Likewise, the second term [UpRTOV$_n$-UpRTOV$_0$] represents the gradient of a speed ratio change during the linear mode.

A target rotation speed during the linear mode is calculated by Equation (2). Specifically, the speed ratio is converted into the rotation speed by multiplying the target speed ratio calculated by Equation (1) by the output shaft rotation speed OutREV, and the smaller one of this and the upper limit rotation speed LMODLim is selected and set as the target CVT input rotation speed DsrREV.

Figure 4:
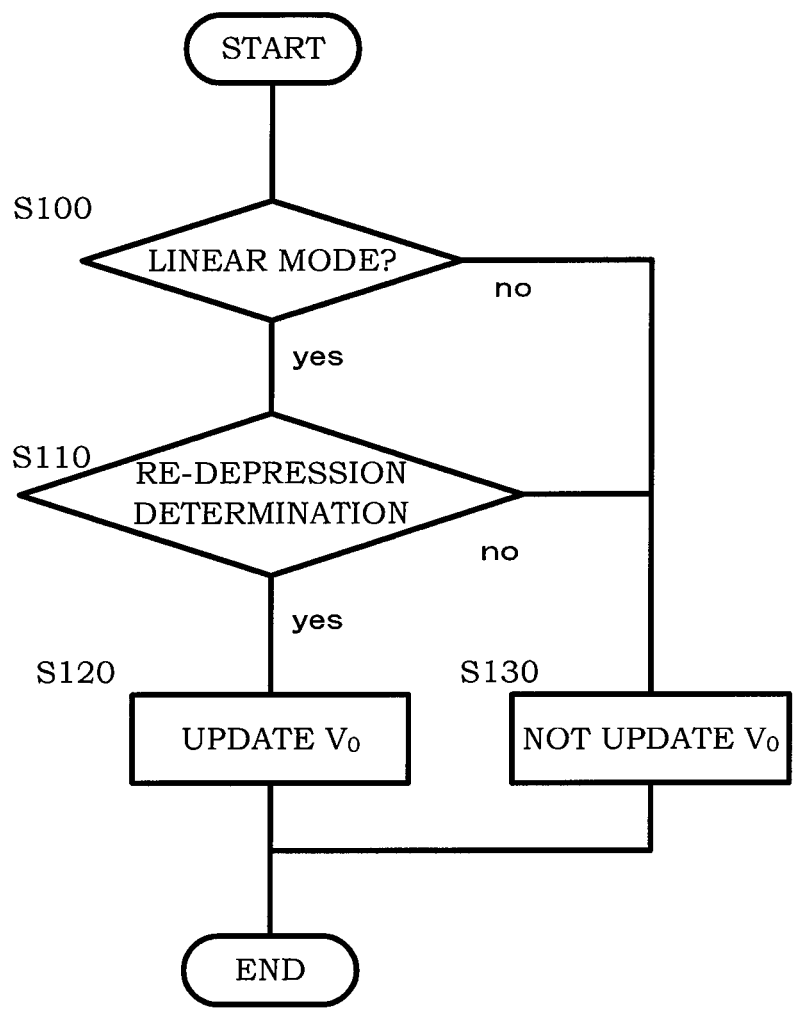
FIG. 4 is a flow chart showing an acceleration start vehicle speed update routine executed by the continuously variable transmission controller during the linear mode.

FIG. 4 is a flow chart showing an acceleration start vehicle speed update routine executed by the continuously variable transmission controller 7 during the linear mode. This control routine is for updating the acceleration start vehicle speed $V_0$ from the vehicle speed set when a switch is made to the linear mode to a vehicle speed when an accelerator pedal is further depressed if a driver further depresses the accelerator pedal while the linear mode is in execution. Effects by this are described later. This routine is described in accordance with steps of the flow chart below.

In Step S100, the continuously variable transmission controller 7 determines whether or not the linear mode is in execution. A processing of Step S110 is performed if the linear mode is in execution, whereas a processing of Step S130 is performed unless the linear mode is in execution.

In Step S110, the continuously variable transmission controller 7 makes a re-depression determination based on a detection value of the accelerator sensor 9 and performs a processing of Step S120 if the accelerator pedal has been depressed while performing a processing of Step S130 unless the accelerator pedal has been depressed.

The re-depression determination is for determining whether or not there is an intention to further accelerate during the execution of the linear mode. For example, the presence of the intention to further accelerate is determined if the accelerator pedal opening APO is larger than a threshold value A set in advance and an accelerator pedal opening speed is higher than a threshold value B set in advance. The threshold value A is set, for example, at an opening of about 2/8 of the full stroke. Further, the threshold value B is set, for example, at 20 [deg/sec]. It should be noted that further acceleration during the execution of the linear mode is referred to as "re-acceleration" in the following description.

In Step S120, the continuously variable transmission controller 7 updates the acceleration start vehicle speed $V_0$ and finishes the process this time. Here, when the acceleration start vehicle speed $V_0$ is updated, a new shift line is generated in accordance with the control block of FIG. 3 described above.

In Step S130, the continuously variable transmission controller 7 finishes the process this time without updating the acceleration start vehicle speed $V_0$.

Figure 5:
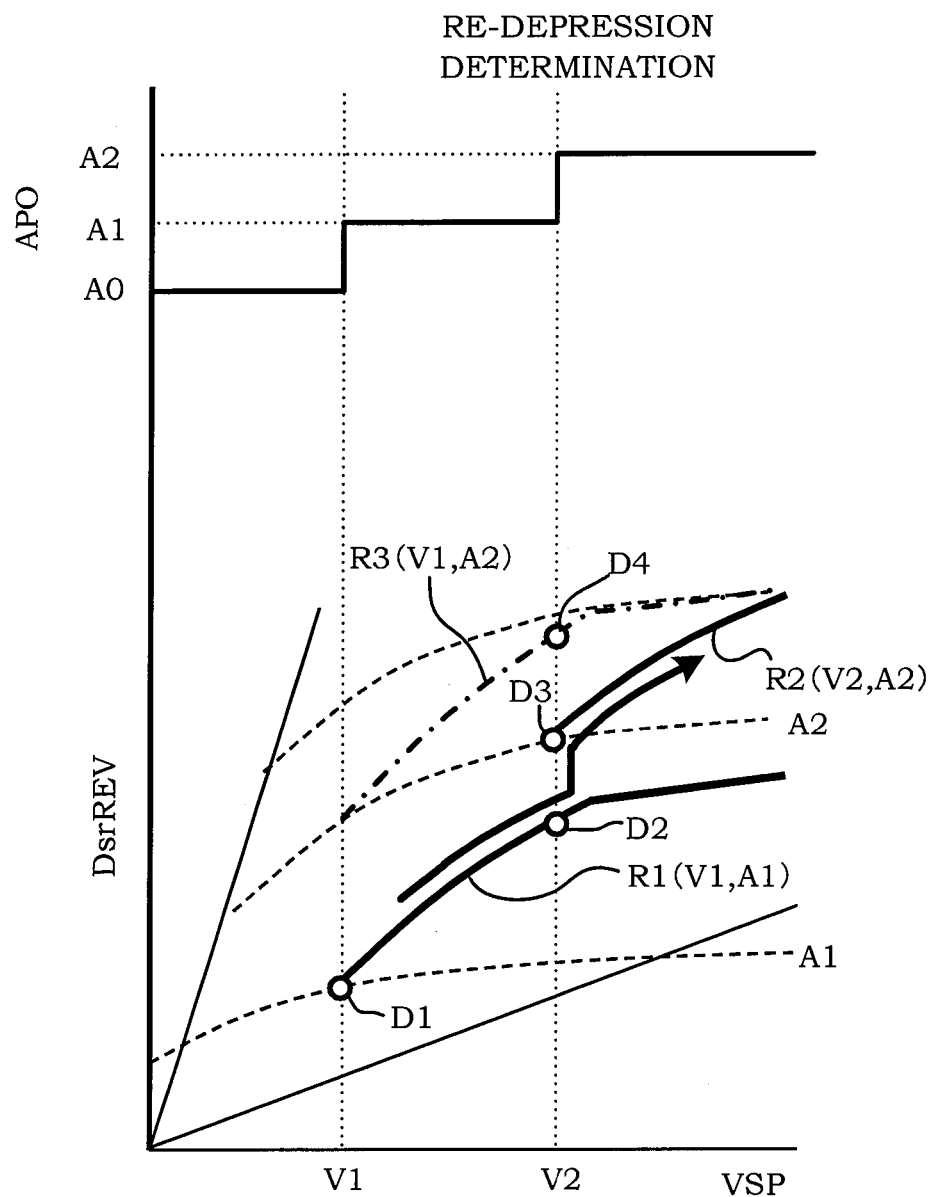
FIG. 5 is a graph showing effects in the case of executing the control routine of FIG. 4.

FIG. 5 is a graph showing effects when the control routine of FIG. 4 is executed. A horizontal axis represents the vehicle speed VSP, an upper part shows a change in the accelerator pedal opening APO and a lower part shows shift lines. Broken lines in FIG. 5 show shift lines in the normal mode. A solid line R1 in FIG. 5 is a shift line for an accelerator pedal opening A1 when a vehicle speed $V_1$ is set as the acceleration start vehicle speed $V_0$. Likewise, a solid line R2 is a shift line for an accelerator pedal opening A2 when a vehicle speed $V_2$ is set as the acceleration start vehicle speed $V_0$. Likewise, a dashed-dotted line R3 is a shift line for the accelerator pedal opening A2 when the vehicle speed $V_1$ is set as the acceleration start vehicle speed $V_0$. Further, D1 to D4 show operation points determined from the vehicle speed and the input shaft rotation speed.

In FIG. 5, acceleration is started by the accelerator pedal being depressed from an accelerator pedal opening A0 to the accelerator pedal opening A1 at the vehicle speed $V_1$ and then continues up to the vehicle speed $V_2$ with the accelerator pedal opening kept at A1. In this case, the vehicle speed $V_1$ is set as the acceleration start vehicle speed $V_0$ at the point of the vehicle speed $V_1$ and the down-shift rotation speed and the shift line R1 are set based on this. Specifically, the continuously variable transmission controller 7 sets the operation point at the time of starting acceleration as D1 and controls the speed ratio according to the shift line R1 up to D2.

At the vehicle speed $V_2$, the accelerator pedal is depressed to reach the accelerator pedal opening A2 for re-acceleration. In this case, the acceleration start vehicle speed $V_0$ is updated to the vehicle speed $V_2$ and the down-shift rotation speed and the shift line R2 based on the vehicle speed $V_2$ are newly generated. As a result, the continuously variable transmission controller 7 shifts the operation point from D2 to D3 according to a change in the accelerator pedal opening APO at the vehicle speed $V_2$ and controls the speed ratio according to the shift line R2 from D3 on. Specifically, according to this control routine, the operation point changes as shown by an arrow in FIG. 5.

Contrary to this, if the acceleration start vehicle speed $V_0$ is not updated at the time of re-acceleration, the shift line is not updated, either. Accordingly, the operation point is shifted from D2 to D4 at the time of re-acceleration at the vehicle speed $V_2$. Specifically, an increase in the input shaft rotation speed associated with the re-acceleration is larger as compared with the case where this control routine is executed and the rubber band feel may occur.

As just described, in the present embodiment, the acceleration start vehicle speed $V_0$ is updated in the case of detecting an intention to re-accelerate. Thus, an excessive increase in the target CVT input rotation speed DsrREV at the time of re-acceleration can be prevented, with the result that the occurrence of the rubber band feel at the time of re-acceleration can be prevented.

Further, since the intention to re-accelerate is determined based on the accelerator pedal opening and the accelerator pedal opening speed, the driver's intention can be accurately detected.

Second Embodiment

A second embodiment is similar to the first embodiment in the configuration of a vehicle to which the present invention is applied. Further, a speed ratio control executed by the continuously variable transmission controller 7 is also basically similar. However, there is a difference in a shift line generation method when a re-acceleration request is made during the execution of the linear mode.

Figure 6:
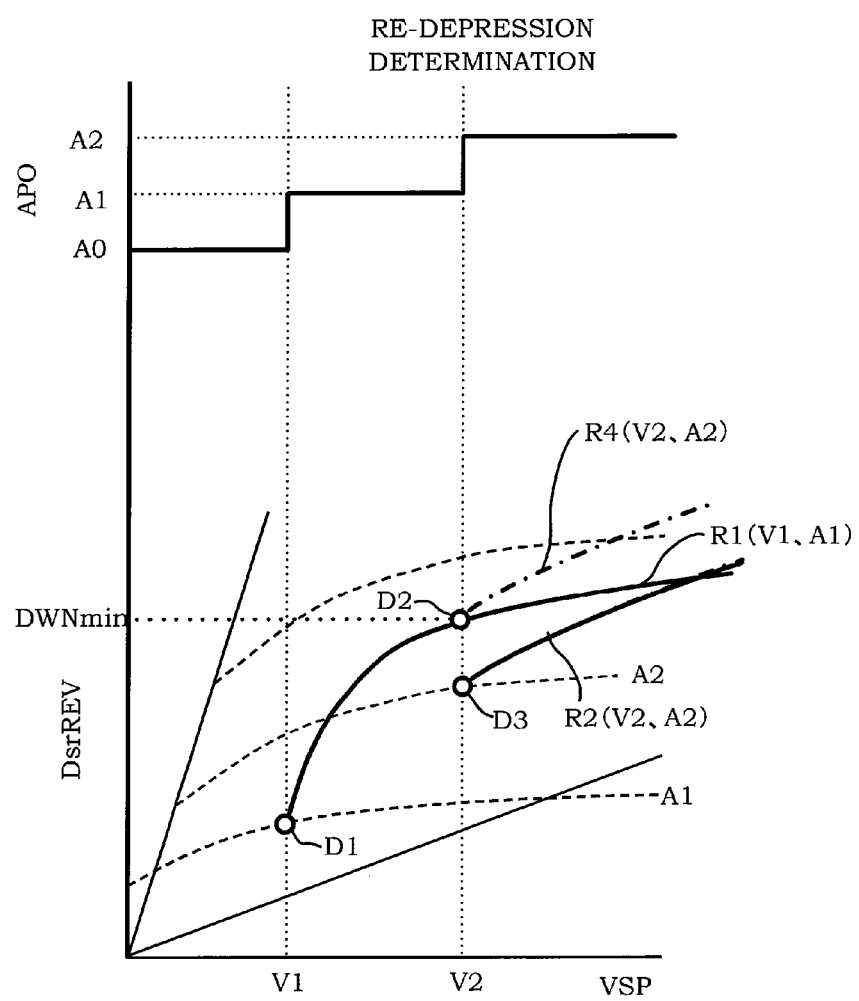
FIG. 6 is a graph showing a shift line generation method of a second embodiment.

FIG. 6 is a graph showing a shift line generation method of the present embodiment. As in FIG. 5, a horizontal axis represents the vehicle speed VSP, an upper part shows a change in the accelerator pedal opening APO and a lower part shows shift lines. Broken lines in FIG. 6 show shift lines in the normal mode. A solid line R1 in FIG. 6 is a shift line for the accelerator pedal opening A1 when the vehicle speed $V_1$ is set as the acceleration start vehicle speed $V_0$. Likewise, a solid line R2 is a shift line for the accelerator pedal opening A2 when the vehicle speed $V_2$ is set as the acceleration start vehicle speed $V_0$. Likewise, a dashed-dotted line R4 is a shift line when the target CVT input rotation speed DsrREV is maintained at a lower limit value DWNmin.

The second embodiment is similar to the first embodiment in that a transition is made to the linear mode at the vehicle speed $V_1$, the speed ratio control is executed according to the shift line R1, re-acceleration at the vehicle speed $V_2$ is detected, the acceleration start vehicle speed $V_0$ is updated to the vehicle speed $V_2$ and the shift line R2 is generated based on the updated acceleration start vehicle speed.

However, if a transition is made from the shift line R1 to the shift line R2 according to the update of the acceleration start vehicle speed, the operation point is shifted from D2 to D3 and the target CVT input rotation speed DsrREV decreases. Such a reduction in the target CVT input rotation speed DsrREV at the time of acceleration gives a sense of incongruity to a driver.

Accordingly, the lower limit value DWNmin is provided for the target CVT input rotation speed DsrREV after the update of the acceleration start vehicle speed so that the target CVT input rotation speed DsrREV does not decrease when a transition is made to the linear mode. The target CVT input rotation speed DsrREV before 80 msec from the update of the acceleration start vehicle speed (hereinafter, merely referred to as "target CVT input rotation speed DsrREV before 80 msec") is used, for example, as the lower limit value DWNmin. Specifically, the first term of Equation (1) of FIG. 3 becomes as shown in the following Equation (3).

$$\text{MAX(LNRdwREV0,DsrREV before 80 msec)/LNROutREV0} \quad (3)$$

It should be noted that the target CVT input rotation speed DsrREV before 80 msec is just an example of a vehicle speed before the update of the acceleration start vehicle speed and another value may be used.

It is assumed that the shift line R4 having a speed ratio change characteristic similar to that of the shift line R2 is generated from the operation point D2 determined as described above as a starling point and the speed ratio control is executed according to this shift line R4. Further, the lower limit value DWNmin is stored.

By providing the lower limit value DWNmin as described above, it can be avoided that a sense of incongruity that the input rotation speed of the continuously variable transmission 3 decreases despite ongoing acceleration is given to the driver.

Next, a control in the case of returning the accelerator pedal after re-acceleration during the execution of the linear mode (hereinafter, referred to as an accelerator pedal opening returning operation) is described. The continuously variable transmission controller 7 continues to reduce the lower limit value DWNmin during the accelerator pedal opening returning operation when the accelerator pedal opening returning operation is performed after re-acceleration during the execution of the linear mode. That is, the lower limit value DWNmin continues to be updated to a smaller value during the accelerator pedal opening returning operation.

Figure 7:
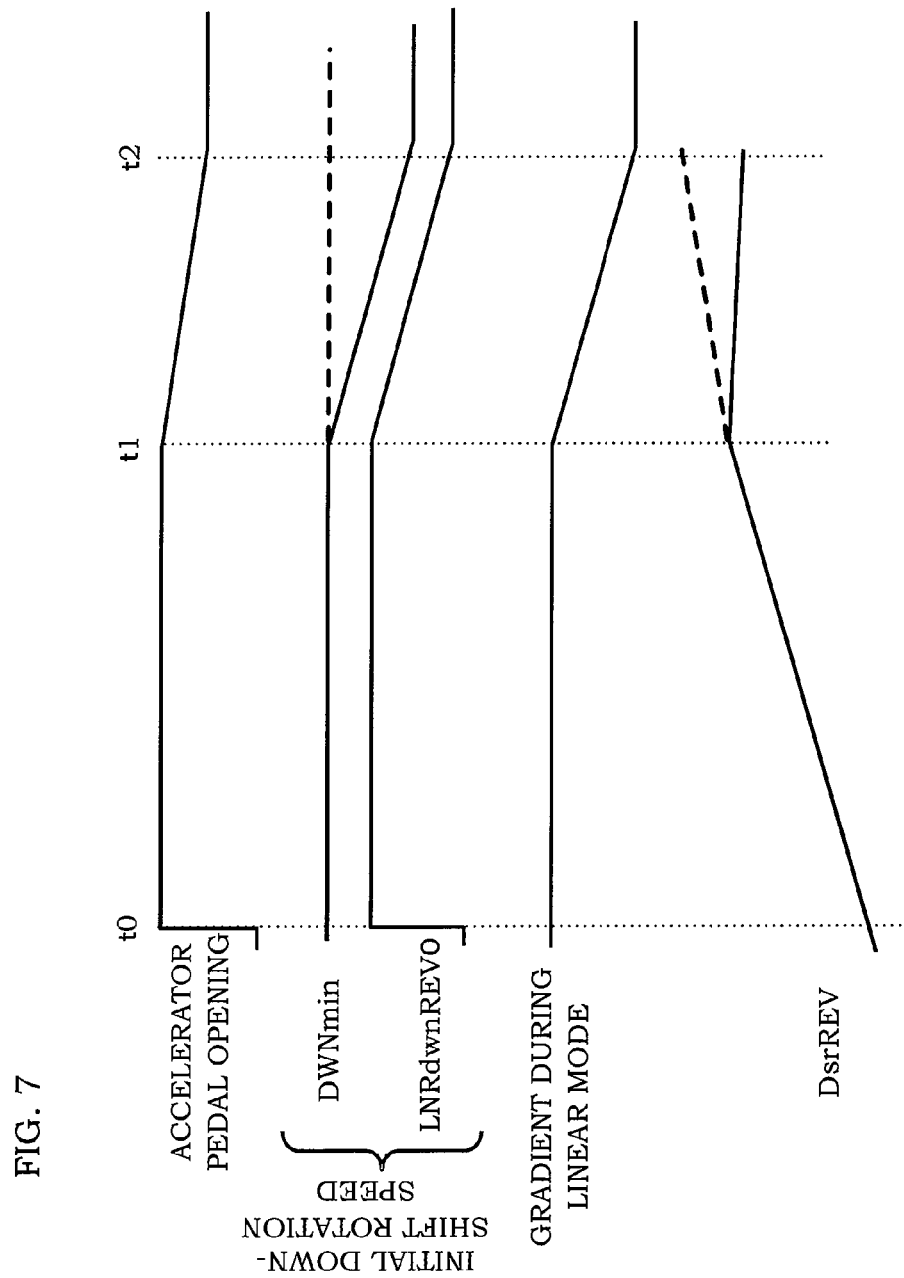
FIG. 7 is a time chart in the case of performing an accelerator pedal opening returning operation after re-acceleration.

FIG. 7 is a time chart in the case of the accelerator pedal opening returning operation after re-acceleration during the execution of the linear mode. Solid lines in FIG. 7 show a case where the lower limit value DWNmin is updated during the returning operation and broken lines show a case where it is not updated.

The continuously variable transmission controller 7 calculates the target CVT input rotation speed DsrREV while limiting the lower limit value DWNmin by the aforementioned Equations (1), (3) during the execution of the linear mode. Accordingly, when the accelerator pedal is depressed to start acceleration at timing t0, an initial down-shift rotation speed LNRdwnREV0 is calculated. Since this initial down-shift rotation speed LNRdwnREV0 is lower than the lower limit value DWNmin, the lower limit value DWNmin is used as the down-shift rotation speed.

Since the accelerator pedal opening is kept constant up to timing t1, the target CVT input rotation speed DsrREV increases with a constant gradient.

When the accelerator pedal opening returning operation is performed at timing t1, the initial down-shift rotation speed LNRdwnREV0 decreases as is clear from the down-shift rotation speed map 30 of FIG. 3. Further, the gradient during the linear mode also becomes smaller as is clear from the up-shift ratio map 31 of FIG. 3 and Equation (1).

At this time, since the initial down-shift rotation speed LNRdwnREV0 is lower than the lower limit value DWNmin, the lower limit value DWNmin is used as the down-shift rotation speed. Accordingly, unless the lower limit value DWNmin is updated, the target CVT input rotation speed DsrREV increases as shown by a broken line of FIG. 7 despite the fact that the accelerator pedal has been returned at timing t1. Contrary to this, if the lower limit value DWNmin is gradually updated to a smaller value, an increase in the target CVT input rotation speed DsrREV is stopped in response to the accelerator pedal opening returning operation.

The lower limit value DWNmin may be so updated as to at least gradually become a smaller value. This is because an increase in the target CVT input rotation speed DsrREV is stopped if the lower limit value DWNmin decreases.

It is more preferable to reduce the lower limit value DWNmin in such a manner as to maintain a difference between the lower limit value DWNmin and the initial down-shift rotation speed LNRdwREV0 at the start of the accelerator pedal opening returning operation. This is because the lower limit value DWNmin decreases with the same gradient as the initial down-shift rotation speed LNRdwnREV0 that changes in response to the driver's accelerator pedal operation, with the result that the target CVT input rotation speed DsrREV changes more in accordance with the driver's intention.

As just described, in the present embodiment, the lower limit value DWNmin is set for the target CVT input rotation speed DsrREV after the update of the acceleration start vehicle speed and the speed ratio control is so executed that the target CVT input rotation speed DsrREV does not fall below this. By this, it can be avoided that a sense of incongruity that the input shaft rotation speed decreases despite ongoing acceleration is given to a driver.

Further, since the lower limit value DWNmin is updated to a smaller value during the accelerator pedal opening returning operation, a situation where an increase in the target CVT input rotation speed DsrREV cannot be stopped despite the execution of the returning operation can be avoided.

Although the embodiments of the present invention have been described above, the above embodiments are only an illustration of some application examples of the present invention and not intended to limit the technical scope of the present invention to the specific configurations of the above embodiments.

The present application claims a priority of Japanese Patent Application No. 2011-194774 filed with the Japan Patent Office on Sep. 7, 2011, all the contents of which are hereby incorporated by reference.

The invention claimed is:

1. A control device for continuously variable transmission, comprising:
    an operating state detection device adapted to detect an operating state of a vehicle including a vehicle speed and an accelerator pedal opening;
    a control device adapted to control a speed ratio of a continuously variable transmission based on the operating state;
    an acceleration request determination device adapted to determine the presence or absence of an acceleration request of a driver based on the accelerator pedal opening; and
    a speed ratio setting device adapted to set a speed reduction ratio controlled by the control device to be smaller with an increase in an acceleration start vehicle speed if the accelerator pedal opening is equal during acceleration;
    the control device updates the acceleration start vehicle speed to a vehicle speed at the time of a determination after determining that the accelerator pedal opening has been increased during acceleration, and sets a continuously variable transmission input shaft rotation speed based on a transmission characteristic before the update of the acceleration start vehicle speed as a lower limit value of the continuously variable transmission input shaft rotation speed after the update if the continuously variable transmission input shaft rotation speed based on a transmission characteristic after the update is lower than the continuously variable transmission input shaft rotation speed based on the transmission characteristic before the update.

2. The control device for continuously variable transmission according to claim 1, wherein:
    the control device determines that the accelerator pedal opening has increased when the accelerator pedal opening is larger than an accelerator pedal opening threshold value and an accelerator pedal opening changing speed is higher than a changing speed threshold value.

3. The control device for continuously variable transmission according to claim 1, wherein:
    the control device reduces the lower limit value of the continuously variable transmission input shaft rotation speed during an accelerator pedal opening returning operation if detecting the start of the accelerator pedal opening returning operation after the accelerator pedal opening is increased.

4. A control device for continuously variable transmission, comprising:
    operating state detection means for detecting an operating state of a vehicle including a vehicle speed and an accelerator pedal opening;
    control means for controlling a speed ratio of a continuously variable transmission based on the operating state;
    acceleration request determination means for determining the presence or absence of an acceleration request of a driver based on the accelerator pedal opening; and
    speed ratio setting means for setting a speed reduction ratio controlled by the control means to be smaller with an increase in an acceleration start vehicle speed if the accelerator pedal opening is equal during acceleration;

the control means updating the acceleration start vehicle speed to a vehicle speed at the time of a determination after determining that the accelerator pedal opening has been increased during acceleration, and setting a continuously variable transmission input shaft rotation speed based on a transmission characteristic before the update of the acceleration start vehicle speed as a lower limit value of the continuously variable transmission input shaft rotation speed after the update if the continuously variable transmission input shaft rotation speed based on a transmission characteristic after the update is lower than the continuously variable transmission input shaft rotation speed based on the transmission characteristic before the update.

5. A control method for continuously variable transmission, comprising:

detecting an operating state of a vehicle including a vehicle speed and an accelerator pedal opening;

controlling a speed ratio of a continuously variable transmission based on the operating state;

determining the presence or absence of an acceleration request of a driver based on the accelerator pedal opening;

setting a speed reduction ratio to be smaller with an increase in an acceleration start vehicle speed if the accelerator pedal opening is equal during acceleration; and updating the acceleration start vehicle speed to a vehicle speed at the time of a determination after determining that the accelerator pedal opening has been increased during acceleration, and setting a continuously variable transmission input shaft rotation speed based on a transmission characteristic before the update of the acceleration start vehicle speed as a lower limit value of the continuously variable transmission input shaft rotation speed after the update if the continuously variable transmission input shaft rotation speed based on a transmission characteristic after the update is lower than the continuously variable transmission input shaft rotation speed based on the transmission characteristic before the update.

* * * * *